US012305835B2

(12) United States Patent
Pezzino

(10) Patent No.: US 12,305,835 B2
(45) Date of Patent: May 20, 2025

(54) OUTDOOR LAMP POST DECORATING DEVICE

(71) Applicant: Joanne Pezzino, Sun City Center, FL (US)

(72) Inventor: Joanne Pezzino, Sun City Center, FL (US)

( * ) Notice: Subject to any disclaimer, the term of this patent is extended or adjusted under 35 U.S.C. 154(b) by 0 days.

(21) Appl. No.: 18/426,831

(22) Filed: Jan. 30, 2024

(65) Prior Publication Data

US 2024/0295310 A1 Sep. 5, 2024

Related U.S. Application Data

(60) Provisional application No. 63/450,038, filed on Mar. 5, 2023.

(51) Int. Cl.

| | |
|---|---|
| ***F21V 21/096*** | (2006.01) |
| ***F21S 4/10*** | (2016.01) |
| ***F21S 9/03*** | (2006.01) |
| *F21W 121/00* | (2006.01) |

(52) U.S. Cl.

CPC .............. *F21V 21/096* (2013.01); *F21S 4/10* (2016.01); *F21S 9/03* (2013.01); *F21W 2121/00* (2013.01)

(58) Field of Classification Search

CPC ....... F21S 4/00; F21S 4/15; F21S 4/10; F21V 21/096; F21W 2121/00

See application file for complete search history.

(56) References Cited

U.S. PATENT DOCUMENTS

| | | | |
|---|---|---|---|
| 5,178,454 A | 1/1993 | Lai | |
| 5,567,045 A | 10/1996 | Bucek | |
| 6,033,089 A | 3/2000 | Tesauro | |
| 6,902,297 B1 | 6/2005 | Fung | |
| 9,239,139 B2 | 1/2016 | McCauley | |
| 2010/0088878 A1 | 4/2010 | McCauley | |
| 2018/0295701 A1* | 10/2018 | Loomis | H05B 47/18 |
| 2021/0063002 A1* | 3/2021 | Kennedy | F21V 21/0816 |

* cited by examiner

*Primary Examiner* — Anne M Hines

(74) *Attorney, Agent, or Firm* — Brennan, Manna & Diamond, LLC

(57) ABSTRACT

The present invention relates to an outdoor lamp post decorating device. The device can be applied to the top and base of an outdoor lamp post to allow string lights to be hung from the lamp post in a cone-like, radial pattern around the post. The device is comprised of a top ring and a bottom ring that attach around the top and base of a lamp post. Each ring is comprised of fasteners that can receive string lights.

14 Claims, 5 Drawing Sheets

OUTDOOR LAMP POST DECORATING DEVICE

CROSS-REFERENCE TO RELATED APPLICATION

The present application claims priority to, and the benefit of, U.S. Provisional Application No. 63/450,038, which was filed on Mar. 5, 2023, and is incorporated herein by reference in its entirety.

FIELD OF THE INVENTION

The present invention relates generally to the field of lamp post decorating. More specifically, the present invention relates to an outdoor lamp post decorating device. The device can be applied to the top and base of an outdoor lamp post to allow string lights to be hung from the lamp post in a cone-like, radial pattern around the post. Accordingly, the present disclosure makes specific reference thereto. Nonetheless, it is to be appreciated that aspects of the present invention are also equally applicable to other like applications, devices, and methods of manufacture.

BACKGROUND

Many individuals, businesses, cities, etc., may wish to decorate their outdoor lamp posts for different holidays like Christmas, Halloween, and more. However, installing lights, garlands, and other items on outdoor lamp posts can be difficult due to the height of the posts. In addition, said individuals may lack the physical ability and tools to properly install lights around the posts. Furthermore, climbing a ladder to reach the top of a post to install decorations can be dangerous and difficult for many individuals.

Therefore, there exists a long-felt need in the art for a device that can be used to decorate a lamp post. More specifically, there exists a long-felt need in the art for an outdoor lamp post decorating device that allows a user to easily decorate a lamp post. In addition, there exists a long-felt need in the art for an outdoor lamp post decorating device that allows a user to easily decorate a lamp post in a manner not available with existing lamp posts known in the art.

The subject matter disclosed and claimed herein, in one embodiment thereof, comprises an outdoor lamp post decorating device. The device is primarily comprised of a top ring comprised of at least one fastener, a bottom ring comprised of at least one fastener, and at least one string with at least one light. The top ring can be secured around the top of a lamp post and wherein the bottom ring can be secured around the bottom of the lamp post. Then, the string light can be attached to the fastener of the top ring and bottom ring such that the light runs from the top ring to the bottom ring. A plurality of string lights can then be attached radially around the post via the rings such that the lights form a cone-like shape around the post. The rings can remain around the posts during all seasons, wherein lights and other decorations can be easily removed and replaced from the fasteners of each ring.

In this manner, the outdoor lamp post decorating device of the present invention accomplishes all the foregoing objectives and provides a device that can be used to decorate a lamp post. More specifically, the device allows a user to easily decorate a lamp post for various seasons and holidays while the device remains attached to the lamp post. In addition, the device allows a user to easily decorate a lamp post in a manner not available with existing lamp posts known in the art.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an outdoor lamp post decorating device primarily comprised of a top ring comprised of at least one fastener, a bottom ring comprised of at least one fastener, and at least one string with at least one light. The device can be placed around a lamp post to allow lights to be hung from the lamp post.

The top ring may be non-continuous such that it can be wrapped around the top area of a lamp post. In one embodiment, the ring is magnetic such that it magnetically attaches to a metal lamp post. In another embodiment, the ring may be comprised of at least one attachment fastener that allows the ring to attach to the top area. Said fastener may include, but is not limited to, hook and loop, adhesive, magnet, etc.

The bottom ring may also be non-continuous such that it can be wrapped around the bottom area of a lamp post. The ring can then be secured in a continuous position around the lamp post via at least one threaded adjustment fastener that can be tightened via hand or tool. The bottom ring is preferably larger in diameter than the top ring. The bottom ring is preferably weighted to prevent the ring from moving.

Both the top ring and bottom ring are comprised of at least one fastener such as, but not limited to, a hook, a clip, a clasp, an opening, etc., that can receive at least one string with at least one light. In this manner, the string can be run from the fastener of the top ring to the fastener of the bottom ring around the lamp post. Because the bottom ring is larger in diameter than the top ring, the string forms a cone-like (i.e., Christmas tree-like) shape around the lamp post.

The present invention is also comprised of a method of using the device. First, a device is provided primarily comprised of a top ring comprised of at least one fastener, a bottom ring comprised of at least one fastener, and at least one string with at least one light. Then, the top ring can be secured around a top area of a lamp post. Next, the bottom ring can be placed around the bottom area of a lamp post. Then, a string light assembly can be attached to a fastener of the top ring and a fastener of the bottom ring. Finally, the light can be illuminated via a remote.

Accordingly, the outdoor lamp post decorating device of the present invention is particularly advantageous as it provides a device that can be used to decorate a lamp post. More specifically, the device allows a user to easily decorate a lamp post for various seasons and holidays while the device remains attached to the lamp post. In addition, the device allows a user to easily decorate a lamp post in a manner not available with existing lamp posts known in the art. In this manner, the outdoor lamp post decorating device overcomes the limitations of existing lamp post decoration devices and methods known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
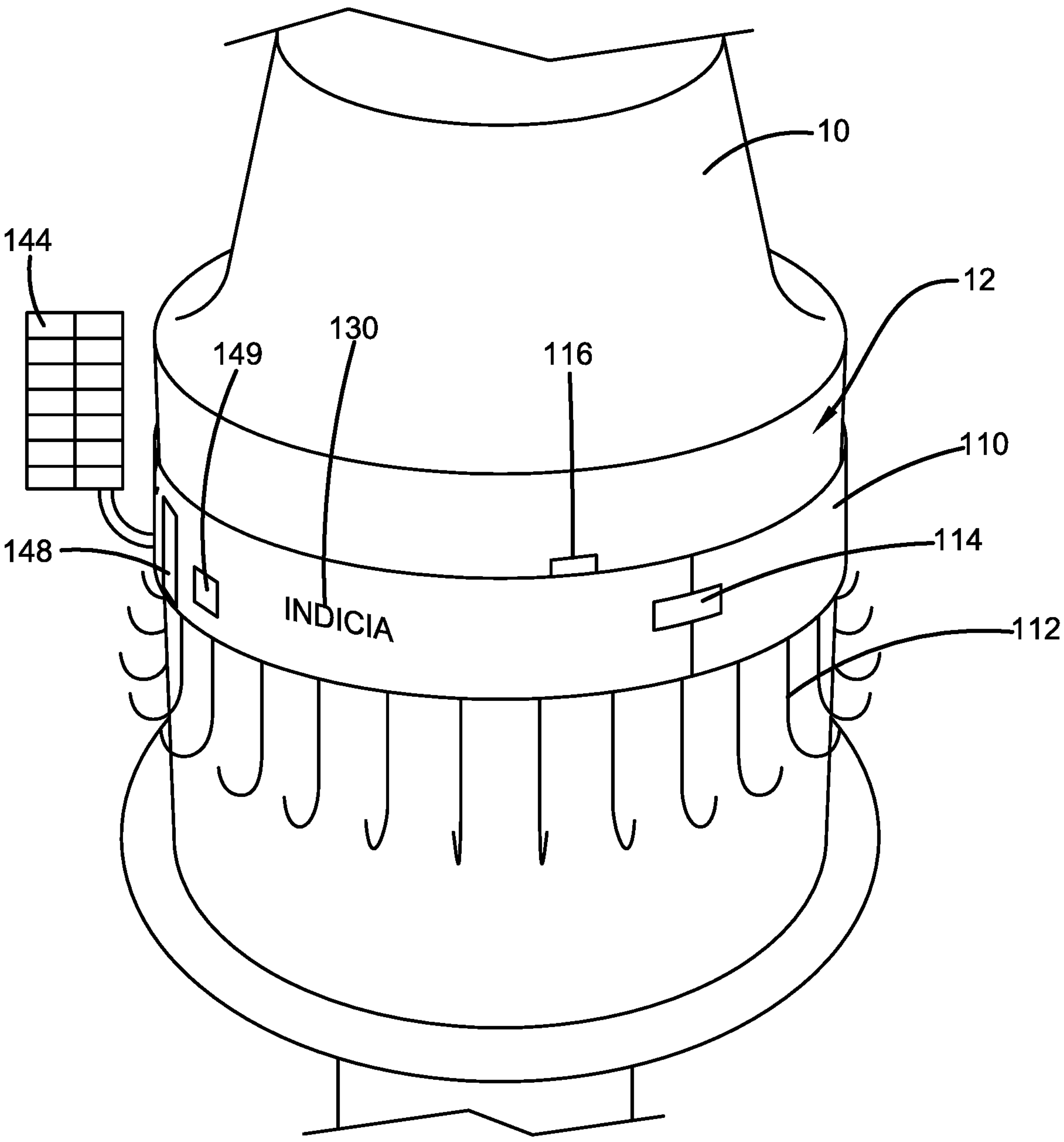
FIG. 1 illustrates an enhanced perspective view of one potential embodiment of an outdoor lamp post decorating device of the present invention while attached to a lamp post in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that can be used to decorate a lamp post. More specifically, there exists a long-felt need in the art for an outdoor lamp post decorating device that allows a user to easily decorate a lamp post. In addition, there exists a long-felt need in the art for an outdoor lamp post decorating device that allows a user to easily decorate a lamp post in a manner not available with existing lamp posts known in the art.

The present invention, in one exemplary embodiment, is comprised of an outdoor lamp post decorating device. The device is primarily comprised of a top ring comprised of at least one fastener, a bottom ring comprised of at least one fastener, and at least one string with at least one light. The device can be placed around a lamp post to allow lights to be hung from the lamp post.

The top ring may be non-continuous such that it can be wrapped around the top area of a lamp post. In one embodiment, the ring is magnetic such that it magnetically attaches to a metal lamp post. In another embodiment, the ring may be comprised of at least one attachment fastener that allows the ring to attach to the top area. Said fastener may include, but is not limited to, hook and loop, adhesive, magnet, etc.

Similarly, the bottom ring may also be non-continuous such that it can be wrapped around the bottom area of a lamp post. The ring can then be secured in a continuous position around the lamp post via at least one threaded adjustment fastener that can be tightened via hand or tool. The bottom ring is preferably larger in diameter than the top ring. The bottom ring is preferably weighted to prevent the ring from moving.

Both the top ring and bottom ring are comprised of at least one fastener. The fastener may be, but is not limited to, a hook, a clip, a clasp, an opening, etc., that can receive at least one string with at least one light. In this manner, the string can be run from the fastener of the top ring to the fastener of the bottom ring around the lamp post. Because the bottom ring is larger in diameter than the top ring, the string forms a cone-like (i.e., Christmas tree-like) shape around the lamp post.

The present invention is also comprised of a method of using the device. First, a device is provided primarily comprised of a top ring comprised of at least one fastener, a bottom ring comprised of at least one fastener, and at least one string with at least one light. Then, the top ring can be secured around a top area of a lamp post. Next, the bottom ring can be placed around the bottom area of a lamp post. Then, a string light assembly can be attached to a fastener of the top ring and a fastener of the bottom ring. Finally, the light can be illuminated via a remote.

Accordingly, the outdoor lamp post decorating device of the present invention is particularly advantageous as it provides a device that can be used to decorate a lamp post. More specifically, the device allows a user to easily decorate a lamp post for various seasons and holidays while the device remains attached to the lamp post. In addition, the device allows a user to easily decorate a lamp post in a manner not available with existing lamp posts known in the art. In this manner, the outdoor lamp post decorating device overcomes the limitations of existing lamp post decoration devices and methods known in the art.

Referring initially to the drawings, FIG. 1 illustrates an enhanced perspective view of one potential embodiment of an outdoor lamp post decorating device 100 of the present invention while attached to a lamp post 10 in accordance with the disclosed architecture. The device 100 is primarily comprised of a top ring 10 comprised of at least one fastener 112, a bottom ring 120 comprised of at least one fastener 122, and at least one string 140 with at least one light 142. The device 100 can be placed around a lamp post 10 to allow lights 142 to be hung from the lamp post 10.

The top ring 110 of the device 100 is preferably comprised of a plastic or metal material and is circular in shape. The ring 110 is non-continuous such that it can be wrapped around the top area 12 of a lamp post 10 (i.e., the area underneath the light of the lamp post 10). In one embodiment, the ring 110 is magnetic such that it magnetically attaches to a metal lamp post 10. In another embodiment, the ring 110 may be comprised of at least one attachment fastener 116 that allows the ring 110 to attach to the top area 12. Said fastener 116 may include, but is not limited to, hook and loop, adhesive, magnet, etc. In another embodiment, the ring 110 can be tightened around the top area 12 via at least one threaded adjustment fastener 114 that can be tightened via hand or tool.

The bottom ring 120 is preferably comprised of a plastic or metal material and is circular in shape. The ring 120 is non-continuous such that it can be wrapped around the bottom area 14 of a lamp post 10 (i.e., the area where the lamp post 10 meets a ground surface). The ring 120 can then be secured in a continuous position around the lamp post 10 via at least one threaded adjustment fastener 124 that can be tightened via hand or tool. The bottom ring 120 is preferably larger in diameter than the top ring 110. The bottom ring 120 is preferably weighted to prevent the ring 120 from moving.

The top ring 110 and bottom ring 120 may be comprised of at least one indicia 130. The indicia 130 may include, but is not limited to, a pattern, a color, a simulative texture, etc. In this manner, the indicia 130 allows the top ring 110 to blend in with the top area 12 of the lamp post 10 and also allows the bottom ring 120 to blend in with a ground surface around the lamp post 10.

Figure 2:
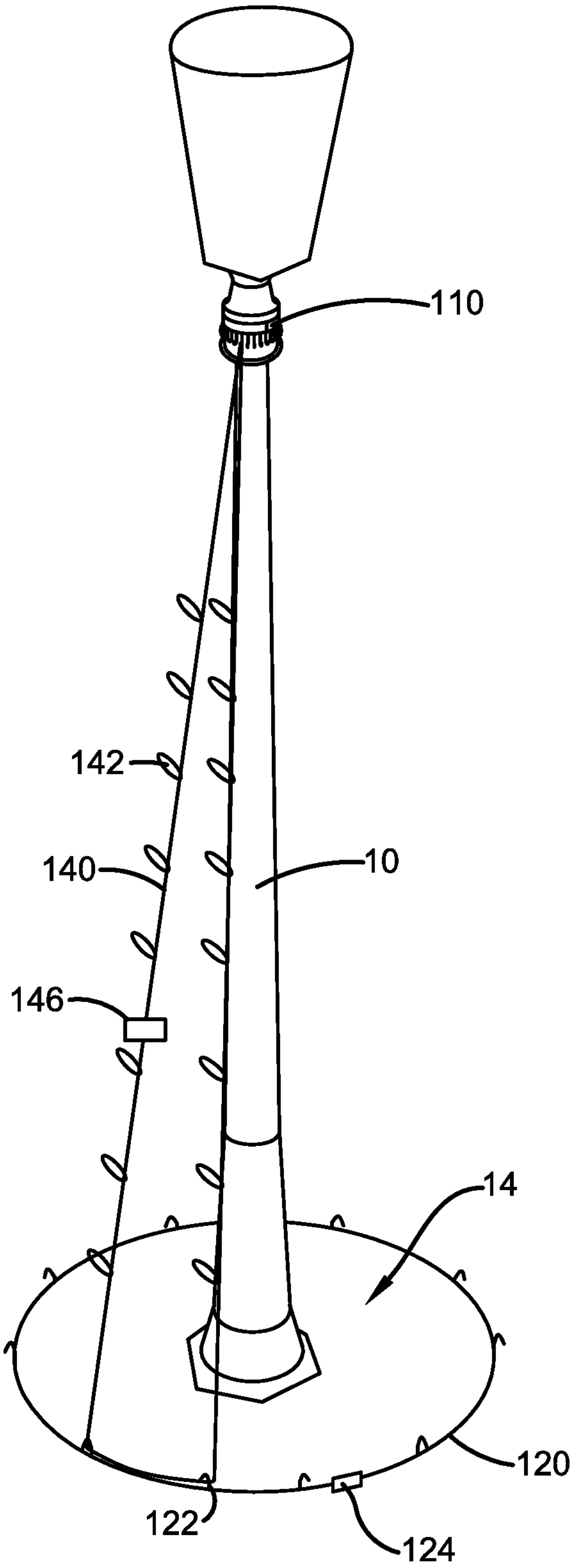
FIG. 2 illustrates a perspective view of one potential embodiment of an outdoor lamp post decorating device of the present invention while attached to a lamp post in accordance with the disclosed architecture.
Figure 3:
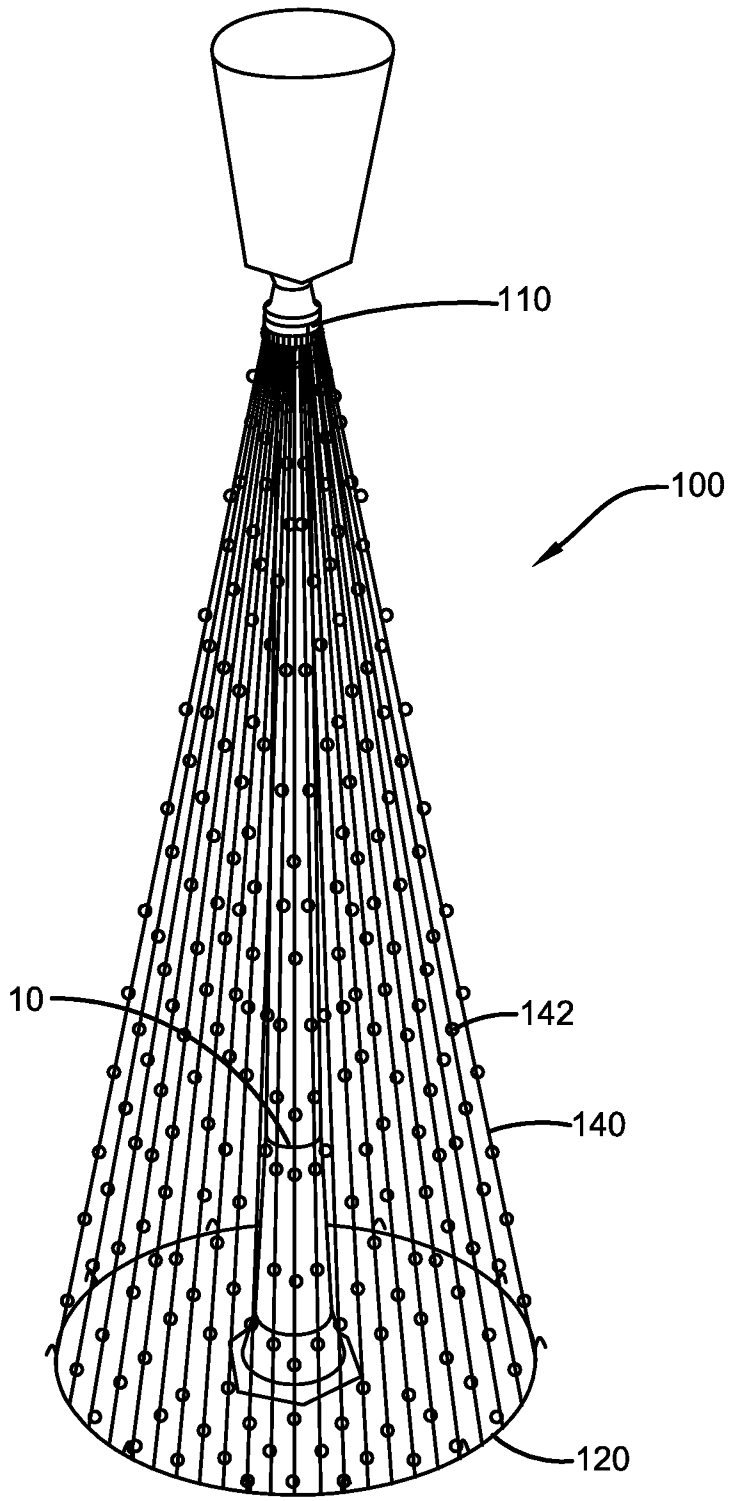
FIG. 3 illustrates a perspective view of one potential embodiment of an outdoor lamp post decorating device of the present invention while attached to a lamp post in accordance with the disclosed architecture.

Both the top ring 110 and bottom ring 120 are comprised of at least one fastener 112,122. The fasteners 112,122 may be fasteners such as, but not limited to, a hook, a clip, a clasp, an opening, etc., that can receive at least one string 140 with at least one light 142, as seen in FIG. 2 and FIG. 3. In this manner, the string 140 can be run from the fastener 112 of the top ring 110 to the fastener 122 of the bottom ring 120 around the lamp post 10. Because the bottom ring 120 is larger in diameter than the top ring 110, the string 140 forms a cone-like (i.e., Christmas tree-like) shape around the lamp post 10.

Figure 4:
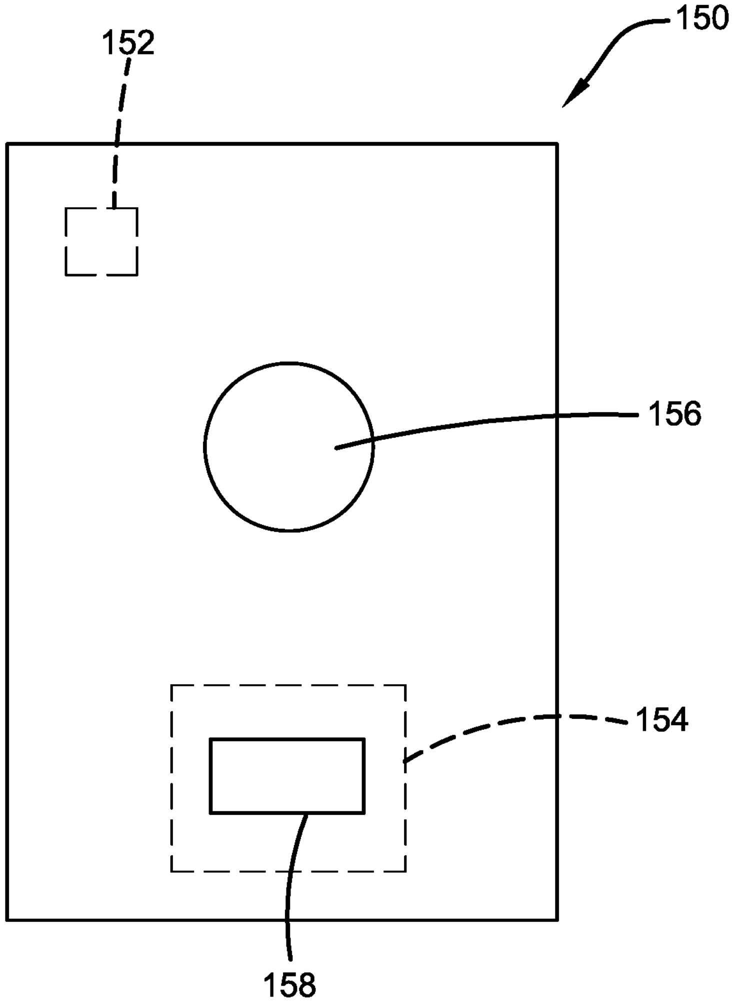
FIG. 4 illustrates a front view of a remote of one potential embodiment of an outdoor lamp post decorating device of the present invention in accordance with the disclosed architecture.

The string 140 and light 142 may be any type of electrical string lights known in the art. In one embodiment, the string 140 is comprised of a simulative pine-tree texture that resembles the needles of a pine tree. The light 142 may be an LED light that illuminates any color, any brightness level, and any illumination pattern (i.e., blinking, strobing, continuous illumination, etc.) known in the art. The color, brightness level, illumination pattern, etc., of the light 142 may be changed via at least one remote 150, as seen in FIG. 4.

At least one transmitter 152 of the remote 150 is in wireless electrical communication with at least one receiver 146 of the light 142 via Wi-Fi, Bluetooth, RFID, etc. The remote 150 is comprised of at least one button 156 that allows a user to change the color, brightness level, and illumination pattern of the light 142. The remote 150 is powered by at least one disposable or rechargeable battery 154. In one embodiment, the battery 154 can be recharged via a charging port 158 such as, but not limited to, a USB charging port 158.

The light 142 may be powered by at least one battery 148 stored in/on the bottom or top ring 110,120 that receives power from at least one solar panel 144 (of any type known in the art). In another embodiment, the string 140 is comprised of a female power receptacle 149 that can receive a male 120*v* power cord or other power-supplying means known in the art. The light 142 may be in wired electrical communication with the battery 148 via the string 140, which in one embodiment is an electrical wire.

Figure 5:
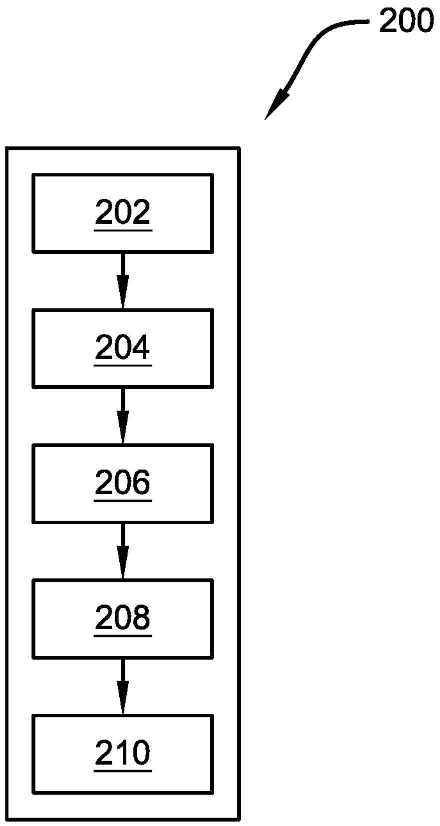
FIG. 5 illustrates a flowchart of a method of using one potential embodiment of an outdoor lamp post decorating device of the present invention in accordance with the disclosed architecture.

The present invention is also comprised of a method of using the device 100, as seen in FIG. 5. First, a device 100 is provided primarily comprised of a top ring 10 comprised of at least one fastener 112, a bottom ring 120 comprised of at least one fastener 122, and at least one string 140 with at least one light 142 [Step 202]. Then, the top ring 110 can be secured around a top area 12 of a lamp post 10 [Step 204]. Then, the bottom ring 120 can be placed around the bottom area 14 of a lamp post 10 [Step 206]. Next, a string 140 light 142 assembly can be attached to a fastener 112 of the top ring 110 and a fastener 122 of the bottom ring 120 [Step 208]. Finally, the light 142 can be illuminated via a remote 150 [Step 210].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "outdoor lamp post decorating device" and "device" are interchangeable and refer to the outdoor lamp post decorating device 100 of the present invention.

Notwithstanding the foregoing, the outdoor lamp post decorating device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the outdoor lamp post decorating device 100 as shown in the FIGS. are for illustrative purposes only, and that many other sizes and shapes of the outdoor lamp post decorating device 100 are well within the scope of the present disclosure. Although the dimensions of the outdoor lamp post decorating device 100 are important design parameters for user convenience, the outdoor lamp post decorating device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An outdoor lamp post decorating device comprising:

a top ring comprised of a first fastener and a magnetic attachment element for securing the top ring to a lamp post;

a weighted bottom ring comprised of a second fastener, a threaded adjustment fastener for securing the top ring to the lamp post, and a simulated texture indicia for camouflaging the weighted bottom ring;

a string comprised of a light; and a remote.

2. The outdoor lamp post decorating device of claim 1, wherein the first fastener is comprised of a hook.

3. The outdoor lamp post decorating device of claim 1, wherein the second fastener is comprised of a hook.

4. The outdoor lamp post decorating device of claim 1, wherein the top ring is comprised of a non-continuous loop.

5. The outdoor lamp post decorating device of claim 1, wherein the bottom ring is comprised of a non-continuous loop.

6. The outdoor lamp post decorating device of claim 1, wherein the light is comprised of a brightness level, a color, and an illumination pattern.

7. The outdoor lamp post decorating device of claim 1, wherein a first diameter of the bottom ring is greater than a second diameter of the top ring.

8. An outdoor lamp post decorating device comprising:

a top ring comprised of a first fastener and a second fastener for magnetically securing the top ring to a lamp post;

a weighted bottom ring comprised of a third fastener and a threaded adjustment fastener for securing the weighted bottom ring to the lamp post;

a string comprised of a light, a receiver, a battery, and a USB charging port; and a remote comprised of a button and a transmitter.

9. The outdoor lamp post decorating device of claim 8, wherein the first fastener is comprised of a hook, a clip, or a clamp.

10. The outdoor lamp post decorating device of claim 8, wherein the bottom ring is comprised of a magnetic material.

11. The outdoor lamp post decorating device of claim 8, wherein the battery is alternatively charged by a solar panel.

12. The outdoor lamp post decorating device of claim 8, wherein a first diameter of the bottom ring is greater than a second diameter of the top ring.

13. A method of using an outdoor lamp post decorating device, the method comprising the steps of:

providing an outdoor lamp post decorative device comprised of a top ring comprised of a first fastener, a bottom ring comprised of a second fastener, and a string with a light;

magnetically securing the top ring around a top area of a lamp post;

placing the bottom ring around a bottom area of a lamp post and threadedly adjusting a diameter of the bottom ring;

attaching the string from the first fastener to the second fastener;

illuminating the light via a remote; and charging a battery in electrical communication with the light via a USB charging port.

14. The method of claim 13, wherein a first diameter of the bottom ring is greater than a second diameter of the top ring.

* * * * *